United States Patent
Kuroda et al.

(10) Patent No.: US 10,052,929 B2
(45) Date of Patent: Aug. 21, 2018

(54) BUSH FOR STABILIZER, FASTENING TOOL, AND FASTENING METHOD

(71) Applicant: NHK SPRING CO., LTD., Yokohama-shi, Kanagawa (JP)

(72) Inventors: Shigeru Kuroda, Yokohama (JP); Shuji Ohmura, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/437,856

(22) PCT Filed: Oct. 17, 2013

(86) PCT No.: PCT/JP2013/078170
§ 371 (c)(1),
(2) Date: Apr. 23, 2015

(87) PCT Pub. No.: WO2014/065186
PCT Pub. Date: May 1, 2014

(65) Prior Publication Data
US 2015/0239319 A1    Aug. 27, 2015

(30) Foreign Application Priority Data

Oct. 26, 2012 (JP) .................................. 2012-236596

(51) Int. Cl.
*A47C 23/00* (2006.01)
*B60G 21/055* (2006.01)
(Continued)

(52) U.S. Cl.
CPC ....... *B60G 21/0551* (2013.01); *B60G 21/055* (2013.01); *F16F 1/16* (2013.01);
(Continued)

(58) Field of Classification Search
CPC ............ B60G 2204/41; B60G 21/0551; B60G 2204/1222; B60G 2204/4104;
(Continued)

(56) References Cited

U.S. PATENT DOCUMENTS 4,951,962 A * 8/1990 Tomida ................. B60G 21/051
280/124.108
5,118,070 A * 6/1992 Reid ................... B60G 21/0551
248/635

(Continued)

FOREIGN PATENT DOCUMENTS

CN          103317994 A      9/2013
GB          2289872 A *     12/1995 ............. B29C 70/84
(Continued)

OTHER PUBLICATIONS

Nov. 26, 2013 Search Report issued in International Application No. PCT/JP2013/078170.
(Continued)

*Primary Examiner* — Bradley T King
*Assistant Examiner* — Mahbubur Rashid
(74) *Attorney, Agent, or Firm* — Oliff PLC (57) ABSTRACT

Bonding the bush to the stabilizer bar, by surface pressure in the bonding surface (inner circumferential surface) of the hole-part of the bush being made uniform, bonding strength is obtained. The first arc part is formed at the opposite side of the opening of the U-shaped part of the bracket in the bonding and second arc part is formed in the opening side, in the hole-part of the bush. The first and second arc parts are circular arc parts being formed in circular arc shape or approximately circular arc shape or are ellipse arc part being formed in the ellipse arc shape or approximately ellipse arc shape. In the hole-part, the center of the first and second arc parts are separated. The curvature radius of the second arc
(Continued)

part gets smaller than the curvature radius of the first arc part. The hole-part is formed in an oval shape.

5 Claims, 5 Drawing Sheets

(51) Int. Cl.
*F16F 1/16* (2006.01)
*F16F 1/38* (2006.01)

(52) U.S. Cl.
CPC .............. *F16F 1/38* (2013.01); *F16F 1/3856* (2013.01); *B60G 2202/135* (2013.01); *B60G 2202/14* (2013.01); *B60G 2204/1222* (2013.01); *B60G 2204/41* (2013.01); *B60G 2204/4103* (2013.01); *B60G 2206/427* (2013.01); *B60G 2206/73* (2013.01); *B60G 2206/821* (2013.01); *B60G 2206/91* (2013.01)

(58) Field of Classification Search
CPC .......... B60G 2204/41042; B60G 2204/41043; B60G 2206/73; B60G 21/055; B60G 2202/14; B60G 2206/427; F16F 1/38; F16F 1/16; F16F 1/3873
USPC ......................................... 267/141, 142, 276
See application file for complete search history.

(56) References Cited

U.S. PATENT DOCUMENTS

| | | | | |
|---|---|---|---|---|
| 7,621,513 B2* | 11/2009 | Owen | ................ | B60G 21/0551 267/188 |
| 8,240,688 B2* | 8/2012 | Miyamoto | ............ | B60G 3/14 267/189 |
| 2002/0014731 A1* | 2/2002 | Palinkas | ............ | B60G 21/0551 267/276 |
| 2003/0111818 A1* | 6/2003 | Carlstedt | ................ | B60G 11/60 280/124.169 |
| 2003/0197343 A1* | 10/2003 | Cai | .................... | B60G 21/0551 280/124.107 |
| 2005/0110234 A1* | 5/2005 | Cai | .................... | B60G 21/0551 280/124.107 |
| 2006/0091595 A1* | 5/2006 | Hayashi | ............. | B60G 21/0551 267/276 |
| 2006/0125165 A1 | 6/2006 | Niwa et al. | | |
| 2008/0067727 A1 | 3/2008 | Schwarz et al. | | |
| 2010/0001448 A1* | 1/2010 | Miyamoto | ......... | B60G 21/0551 267/276 |
| 2010/0244395 A1* | 9/2010 | Sugiura | .............. | B60G 21/0551 280/124.107 |
| 2011/0291377 A1* | 12/2011 | Kato | .................. | B60G 21/0551 280/124.107 |
| 2011/0291378 A1* | 12/2011 | Koumura | .......... | B60G 21/0551 280/124.117 |

FOREIGN PATENT DOCUMENTS

| | | |
|---|---|---|
| JP | S60-8118 U | 1/1985 |
| JP | 2000-193002 A | 7/2000 |
| JP | 2001-270315 A | 10/2001 |
| JP | 2004-138134 A | 5/2004 |
| JP | 2004-210262 A | 7/2004 |
| JP | 2007-127239 A | 5/2007 |
| JP | 2008-018932 A | 1/2008 |
| JP | 2011-168102 A | 9/2011 |
| WO | 2006/008803 A1 | 1/2006 |
| WO | 2011/102373 A1 | 8/2011 |

OTHER PUBLICATIONS

Jul. 11, 2016 Search Report issued in European Patent Application No. 13849085.9.

* cited by examiner

BUSH FOR STABILIZER, FASTENING TOOL, AND FASTENING METHOD

TECHNICAL FIELD

The present invention relates to a bush for a stabilizer, which is attached to a bar of a stabilizer for a vehicle, a bonding tool, which is used during a process of bonding the bush to the bar, and a method for bonding in which the bonding tool is used, and in particular, relates to a technique for improving the strength of the bonding of the bush to the bar.

BACKGROUND ART

Figure 1:
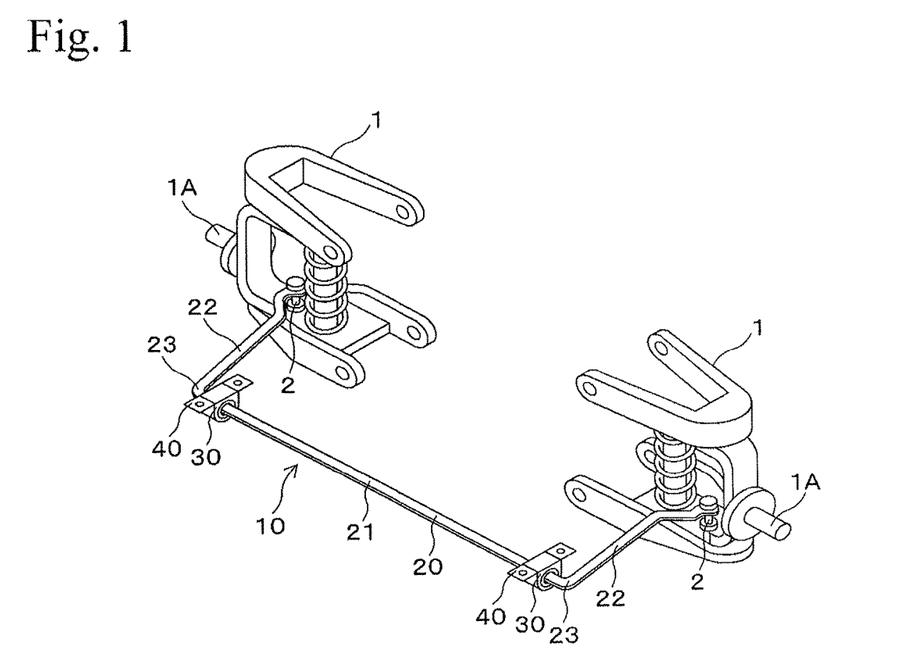
FIG. 1 is an oblique view showing the structure of the stabilizer connected to a suspension device of a vehicle.

A stabilizer, which is used for a vehicle such as an automobile, is a device for maintaining rigidity of the vehicle in a roll. FIG. 1 is a perspective view showing a construction of a stabilizer that is connected to a suspension device of a car. For example, the stabilizer 10 includes a bar 20 that includes a torsion part 21, an arm part 22, and a shoulder part 23, and which is formed approximately in the shape of the letter U.

In the bar 20 of the stabilizer 10, the torsion part 21 is attached to a car body (not shown) via bushes 30 (bush for stabilizer) made of a rubber, and top portions of the arm part 22 are connected to the suspension devices 1 via stabilizer links 2 (for example, see Japanese Unexamined Patent Application Publication No. 2001-270315). Each of the bushes 30 is fixed on the car body by a bracket 40. In such a stabilizer 10, attitude of the vehicle is stabilized by using a torsional reaction force of the bar 20. It should be noted that a tire (not shown) is attached to each of the axle parts 1A located at the left and right of the suspension devices 1.

Figure 2:
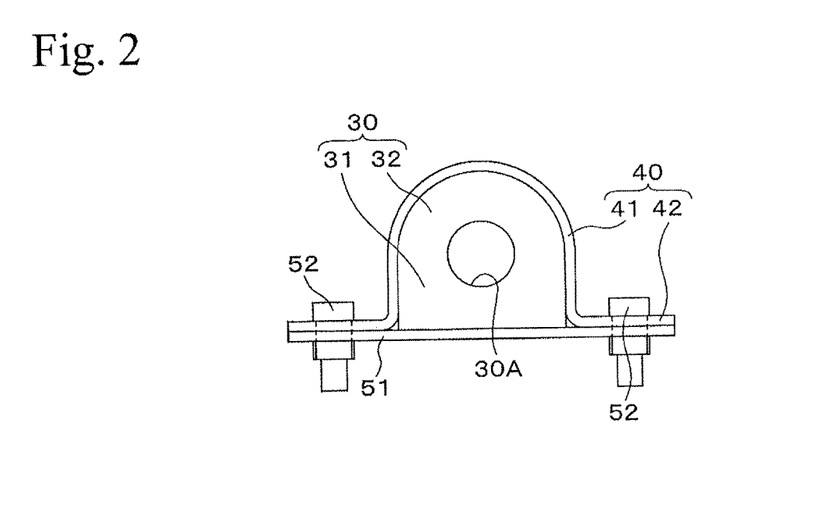
FIG. 2 is a cross sectional view showing the structure of a conventional bush for a stabilizer in which a bracket is attached.

The bush 30 includes a rectangular part 31 of which the cross section of the outer circumferential part is linear and a sector part 32 of which the cross section of outer circumferential part is circular, as shown in FIG. 2, for example. A hole part 30A is formed at the center of the bush 30, and the bar 20 of the stabilizer 10 is inserted in the hole part 30A. The hole part 30A is circular, for example. The bracket 40 includes a U-shaped part 41 (concave part) having cross section in the shape of the letter U, and flange parts 42 extending outwardly from both end parts of the U-shaped part 41, for example, as shown in FIG. 2. The U-shaped part 41 covers the outer circumferential part of the sector part 32 and the outer circumferential side surface part of the rectangular part 31 of the bush 30 so as to contain the bush 30, for example. The flange parts 42 are fixed to a fixing member 51 of a vehicle side such as a plate, by a fastening means 52 such as a bolt, for example. In this case, the vehicle side fixing member 51 is arranged so as to contact a bottom part of the rectangular part 31 exposed from the opening part of the U-shaped part 41.

SUMMARY OF THE INVENTION

As the bush 30, a sliding bush is ordinarily used, which can move relatively along the axial direction of the torsion part of the bar. However, since the sliding bush moves relative to the torsion part of the bar, it may interfere with a part other than the torsion part. In addition, mud and water may penetrate into a gap between the sliding bush and the torsion part of the bar. Therefore, noise may be generated. Furthermore, since the relative positional relationship of the sliding bush and the torsion part may be misaligned, performance of the stabilizer for vehicles cannot be maintained, and therefore, driving stability and ride quality may be adversely affected. In order to solve the above problems, it has been suggested that the bush be fixed to the torsion part by an adhesive.

However, in the shape of the bush 30 shown in FIG. 2, the volume of the bush 30 is uneven along the circumferential direction of the torsion part 21 of the bar 20 which is inserted into the hole 30A. Therefore, during the attaching of the bush 30 to the vehicle side fixing member 51 via the bracket 40, surface pressure of the adhered surface (inner circumferential surface) of the hole part 30A of the bush 30 to the outer circumferential surface of the bar 20 may be uneven. As a result, adhering strength is insufficient at a part at which a small surface pressure is applied to the adhered surface of the hole part 30A of the bush 30, and necessary bonding strength cannot be obtained.

Therefore, an object of the present invention is to provide a technique in which surface pressure at the bonding surface of the hole part of the bush is made to be uniform, so as to obtain necessary bonding strength, in the bonding of the bush to the bar of the stabilizer.

The inventors researched the surface pressure at a bonding surface (inner circumferential surface) of the hole part of the bush to the bar of the stabilizer as follows.

Conventionally, regarding the size relationship of the bush and the stabilizer, an excess part for fastening has been arranged along a direction connecting the U-shaped part (concave part) of the bracket and the center of the hole part (corresponding to vertical direction of the vehicle), in order to maintain surface pressure in the bonding part of the hole part of the bush. However, the excess part for fastening has not been arranged along a direction perpendicular to the direction connecting the concave part of the bracket and the center of the hole part (corresponding to the horizontal direction of the vehicle), in order to maintain assembling workability of the bush at the bracket.

Figure 3A:
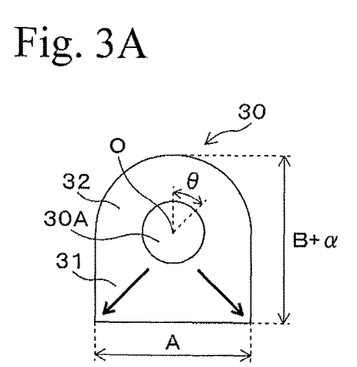
FIG. 3A is a cross sectional view showing the structure of a conventional bush for a stabilizer in which an excess part for fastening is arranged in the vertical direction.
Figure 3B:
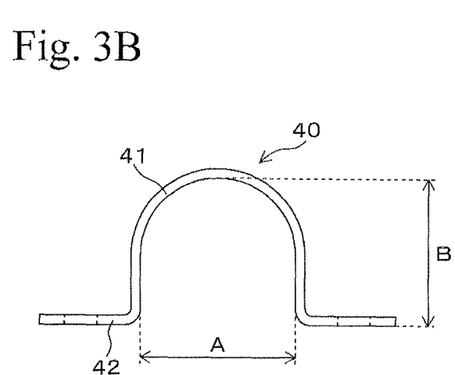
FIG. 3B is a cross sectional view showing the structure of a conventional bracket.

For example, in a case in which a bush 30 and a bracket 40 shown in FIGS. 3A and 3B are used, regarding the vertical direction in the figures (corresponding to the vertical direction of the vehicle), the length of the horizontal direction of the opening part of the U-shaped part of the bracket 40 is set to be A, the length from the upper end of the inner circumferential surface of the U-shaped part 41 of the bracket 40 to the lower end is set to be B, the length in the horizontal direction of the bush 30 is set to be A, and the length in the vertical direction of the bush 30 is set to be (B+α), and thus, the excess part for fastening α is arranged only in the vertical direction. It should be noted that the bush 30 has a shape that is, for example, horizontally symmetric, and the circular shape of the hole part 30A and a circular shape including a sector shape 32 are concentric, for example.

Figure 4:
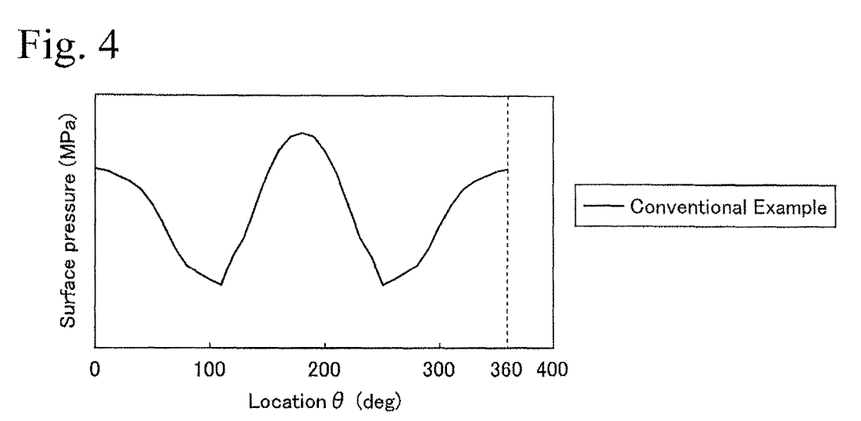
FIG. 4 is graph showing the surface pressure distribution in the bonding surface (inner circumferential surface) of the hole part of the bush for a stabilizer shown in FIG. 3.

Results of research on the surface pressure at the bonding surface of the hole part 30A of the bush 30 in the case of the above size relationship are shown in FIG. 4. It should be noted that degree θ in FIG. 4 is a degree in the clockwise direction from the upper end position of the hole part 30A as shown in FIG. 3A, and 0° and 360° indicate the upper end position of the hole part 30A. For example, as is obvious from FIGS. 3A and 4, in the hole part 30A, the surface pressure is at the maximum value at the part where degree is 0° (upper end) and the part of 180° (lower end), and surface pressure is at the minimum value at the part of about 110° (right of obliquely downward) and the part of about 250° (left of obliquely downward), and thus, there is a large surface pressure difference generated. In the conventional example shown in FIG. 4 for example, the surface pressure difference is about 70%.

The reason for the occurrence of such a large surface pressure difference is considered to be that parts having large thickness with respect to the center of the hole part 30A of the bush 30 (left and right parts of obliquely downward) flow to a direction of bending parts at an interface of the U-shaped part 41 and the flange part 42 in the bracket 40 (direction shown by arrow in FIG. 3A). It should be noted that the surface pressure difference is defined as follows: (surface pressure of maximum surface pressure part at bonding surface (maximum surface pressure)−surface pressure of minimum surface pressure part at bonding surface (minimum surface pressure))/(average value of surface pressure of bonding surface).

As a result, the inventors completed the first to fourth aspects of the invention explained below, in order to reduce the large surface pressure difference at a bonding surface of the hole part of the bush, which is shown in FIG. 4.

The bush for a stabilizer according to the first aspect of the invention is a bush for a stabilizer including a hole part in which a bar of the stabilizer is inserted, and the bush for a stabilizer is contained in a concave part of a bracket and the bar is bonded to the hole part, wherein the hole part includes a first arc part and a second arc part, the center of the first arc part and the center of the second arc part are separate, curvature radius of the second arc part is set to be smaller than that of the first arc part, and during bonding of the bar to the hole part, the first arc part is located at the opposite side of opening part side of the concave part of the bracket, and the second arc part is located at the opening part side of the concave part of the bracket.

In the first aspect of the invention, it should be noted that the arc part is a circular arc part forming a circular arc shape or an approximately circular arc shape, for example, or an ellipse arc part forming an ellipse arc shape or an approximately ellipse arc shape, for example. In this case, the center of the arc part is the center of circle including the circular arc shape in the case of the circular arc shape, and is the center of the ellipse including the ellipse arc shape in the case of the ellipse arc shape. The curvature radius is defined as follows. In a case in which a concave direction of the bracket concave part is set in the upper direction, for example, the first arc part is located upward and the second arc part is located downward. In this case, the curvature radius of the first arc part is the curvature radius at the uppermost part of curve of the first arc part, and the curvature radius of the second arc part is the curvature radius at the lowermost part of curve of the second arc part.

In the first aspect of the invention, the shape of the hole part of the bush is improved. With respect to the shape of the hole part, in order to prevent the right and left obliquely lower parts of the hole part from being minimally unlike as mentioned above, it can be considered that the shape of the hole part is set to be an ellipse, for example, so as to set the length of the hole along the horizontal direction (a direction vertical to a concave direction of the bracket concave part) to be smaller. However, in this case, it is difficult to set the surface pressure difference sufficiently low.

Therefore, in the first aspect of the invention, in the hole part, the first arc part is formed at the opposite side of the opening part of the concave part of the bracket which is used when bonding, and the second arc part is formed at the opening part side of the concave part. In the case in which the first arc part is located at the upside and the second arc part is located at the downside, since the second arc part in which curvature radius is set to be smaller is located at a part corresponding to the right and left obliquely lower parts at which surface pressure is the minimum in the hole part of the conventional example shown in FIG. 3A, the length in the horizontal direction of the hole part at the position is short. In this way, the surface pressure at the part corresponding to the low surface pressure part of the hole part of the conventional example can be sufficiently increased.

In addition, in this case, the centers of the first circular arc part and the second circular arc part are separated from each other. Since surface pressure of a part corresponding to a high surface pressure part (surface pressure in the vertical direction) of the hole part of the conventional example shown in FIG. 3A can be appropriately controlled by appropriately setting the gap between the centers, the surface pressure difference at the bonding surface of the hole part of the bush can be set sufficiently small. In this way, since surface pressure at the bonding surface of the hole part of the bush can be made uniform in bonding of the bush to the bar of the stabilizer, a necessary bonding strength can be obtained. In the first aspect of the invention, cost can be reduced compared to the below-mentioned second aspect of the invention since there is no need to arrange a rigid part.

Various kinds of structures can be employed in the bush for a stabilizer of the first aspect of the invention. For example, a ratio of the gap between the centers of the first and the second arc parts with respect to outer diameter of the bar can be set to be 2 to 7%. For example, the first and second arc parts can be an ellipse arc part, and the hole part can be an oval.

The bush for a stabilizer of the second aspect of the invention is a bush for stabilizer including a hole part in which a bar of the stabilizer is inserted, and the bush for a stabilizer is contained in a concave part of a bracket and the bar is bonded to the hole part, wherein the bush further includes a rigid part, the hole part is an ellipse, and during bonding of the bar to the hole part, the rigid part is arranged at the opening part side of the concave part, and the longer axis of the ellipse is located in a direction parallel to concave direction of the concave part of the bracket.

In the second aspect of the invention, a part of the bush is made rigid, and the shape of the hole part of the bush is improved. Practically, since the rigid part is arranged at a part of the opening side of the concave part of the bracket used in bonding, elastic material of the bush can be prevented from flowing to right and left obliquely lower direction of the hole part as shown in the conventional example shown in FIG. 3A. In addition, since the longer axis of the ellipse of the hole part is located in a direction parallel to the concave direction (for example, vertical direction) of the concave part of the bracket, the shorter axis of the ellipse can be located in a direction perpendicular to the direction (for example, in a horizontal direction in which the excess part for fastening is difficult to arrange), and the length in the horizontal direction of the hole part can be set to be smaller with respect to the outer diameter of the bar of the stabilizer.

Therefore, by appropriately setting the longer and shorter axes of the ellipse, surface pressure at a part corresponding to the low surface pressure part of the hole part of the conventional example shown in FIG. 3A can be sufficiently increased, and the surface pressure difference in the bonding surface of the hole part of the bush can be sufficiently small. In this way, in bonding of the bush to the bar for a stabilizer, since surface pressure in the bonding surface of the hole part of the bush can be made uniform, a necessary bonding strength can be obtained.

Various kinds of structures can be employed in the bush for a stabilizer of the second aspect of the invention. For example, a ratio of the longer diameter of the ellipse of the hole part with respect to the outer diameter of the bar can be set to be 92 to 98% and a ratio of the shorter diameter of the ellipse of the hole part with respect to outer diameter of the bar can be set to be 80 to 90%.

The bonding tool according to the third aspect of the invention is a bonding tool used during bonding of a bar of a stabilizer to hole part of a bush for a stabilizer, including a bush containing part that has a concave part containing the bush, and a plate part which closes the opening part of the concave part of the bush containing part, wherein in the bush containing part, an excess part for fastening is arranged in a direction perpendicular to the concave direction of the concave part, the plate part includes a pressing part which presses the bush exposed from the opening part of the concave part of the bush containing part, and the pressing part includes convex part that protrudes in the concave direction of the concave part of the bush containing part and presses both ends of the bush toward the concave direction.

In the third aspect of the invention, instead of improving the bush, the bonding tool corresponding to the bracket is improved. Practically, the bonding tool includes the bush containing part having the concave part for containing the bush, and the opening part of the concave part is closed by the plate part including the pressing part. In this case, since the excess part for fastening is arranged in a direction perpendicular to the concave direction of the concave part (for example, in a horizontal direction) in the bush containing part, an outer circumferential side surface part of the bush is pressed toward the central part in a horizontal direction of the bush by the bush containing part, and the bonding surface (inner circumferential surface) of the hole part can press the outer circumferential surface of the bar of the stabilizer toward the central part in the horizontal direction. Furthermore, since the convex part of the pressing part of the plate part protrudes in a concave direction (upper direction) of the concave part of the bush containing part and the both ends of the bush are pressed toward the concave direction (upper direction), elastic material of the bush can be prevented from flowing to the right and left obliquely lower direction of the hole part, as shown in the conventional example in FIG. 3A.

Therefore, by appropriately setting the protruding amount of the convex part of the pressing part toward the inside of the concave part of the bush containing part and the protruding amount of the excess part for fastening arranged in the horizontal direction of the bush containing part, the surface pressure of a part corresponding to a high surface pressure part (surface pressure in the vertical direction) of the hole part in the conventional example can be appropriately controlled, and in addition, the surface pressure of a part corresponding to a low surface pressure part of the hole part in the conventional example can be sufficiently increased. As a result, the surface pressure difference in the bonding surface of the hole part of the bush can be set sufficiently small. In this way, in the bonding of the bush to the bar of the stabilizer using the bonding tool, since surface pressure can be made uniform in the bonding surface of the hole part of the bush, necessary bonding strength can be obtained. In this case, the bush having the shape of the conventional example shown in FIG. 3A can be used as it is.

The bonding method according to the fourth aspect of the invention is a method for bonding using the bonding tool of the third aspect of the invention. That is, the method for bonding of the fourth aspect of the invention is a method for bonding using the bonding tool according to the third aspect of the invention, the method includes steps of: the bush in which the bar of the stabilizer is inserted in the hole part is contained into the concave part of the bush containing part, the opening part of the concave part which contains the bush is closed by the plate part, and the bush which is exposed from the opening part of the concave part of the bush containing part is pressed by the pressing part of the plate part, and both end parts of the bush are pressed toward the concave direction by the convex part of the pressing part. By the bonding method of the fourth aspect of the invention, effects similar to that of the third aspect of the invention can be obtained.

According to the present invention, in the bonding of the bush to the bar of the stabilizer, by making the surface pressure of the inner circumferential surface of the hole part of the bush uniform, necessary bonding strength can be obtained.

EXPLANATION OF REFERENCE SYMBOLS

10: Stabilizer, 20: bar, 21: torsion part, 30: bush, 30A: hole part, 40: bracket, 41: U-shaped part (concave part), 42: flange part, 100, 200: bush (bush for stabilizer), 100A, 200A: hole part, 101: first arc part, 102: second arc part, 201: elastic part, 202: rigid part, 300: bonding tool, 301: bush containing part, 302: plate part, 303: pressing part, 303A: convex part, O: center (hole center), O1, O2: center (arc center), r1, r2: curvature radius, t: gap between centers (offset amount), α: excess part for fastening (excess part for fastening in vertical direction), β: excess part for fastening (excess part for fastening in horizontal direction), γ: protruding amount (protruding amount of convex part).

BEST MODE FOR CARRYING OUT THE INVENTION

Figure 5:
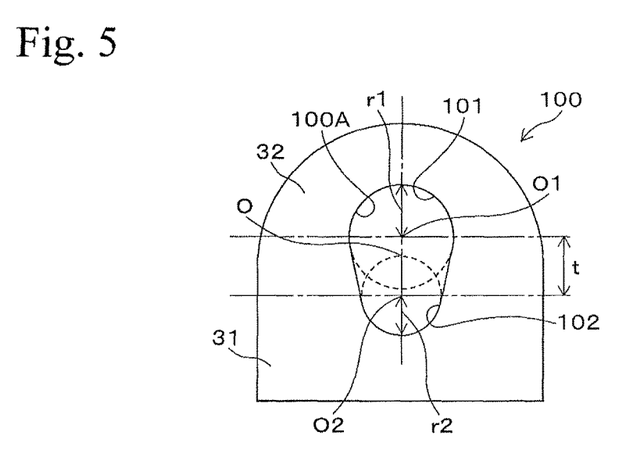
FIG. 5 is a cross sectional view showing the structure of the bush for stabilizer of the first embodiment according to the present invention (the first aspect of the invention).
Figure 6:
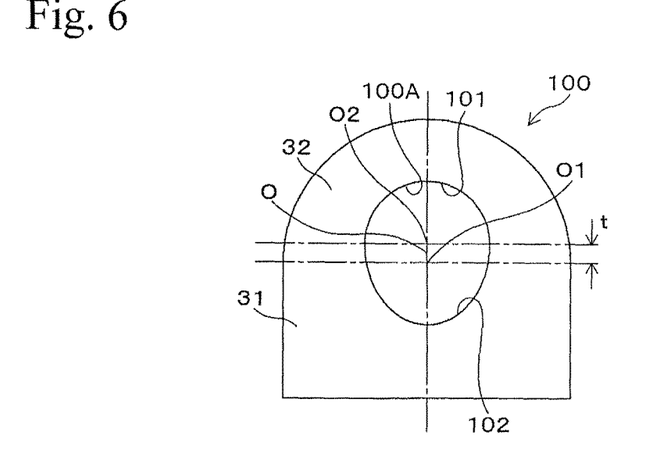
FIG. 6 is a cross sectional view showing the structure of the desirable example of the bush for a stabilizer of the first embodiment according to the present invention (the first aspect of the invention).
Figure 7:
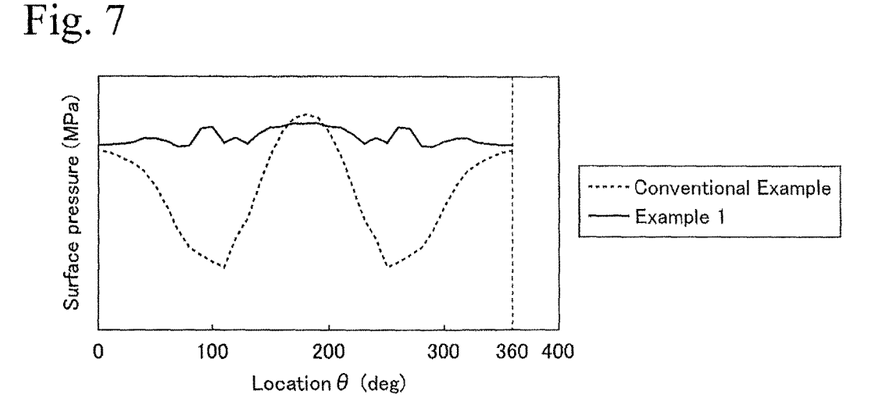
FIG. 7 is a graph showing the surface pressure distribution in the bonding surface (inner circumferential surface) of the hole part of the bush for a stabilizer of the first embodiment according to the present invention (the first aspect of the invention).
Figure 9A:
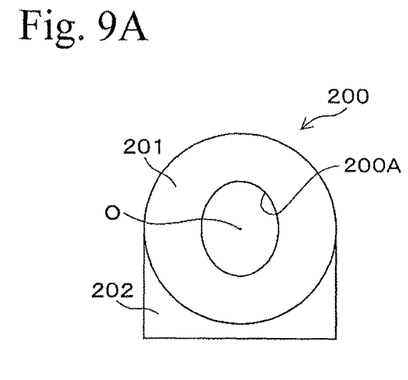
FIGS. 9A and 9B are a cross sectional view showing the structure of the bush for a stabilizer of the second embodiment according to the present invention (the second aspect of the invention).
Figure 9B:
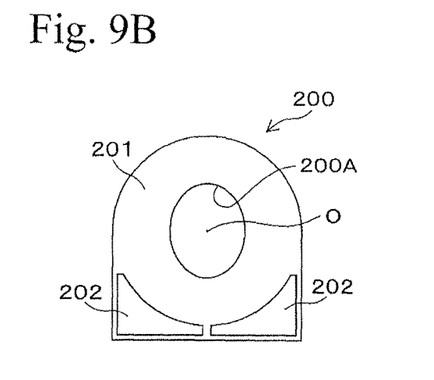
Figure 10:
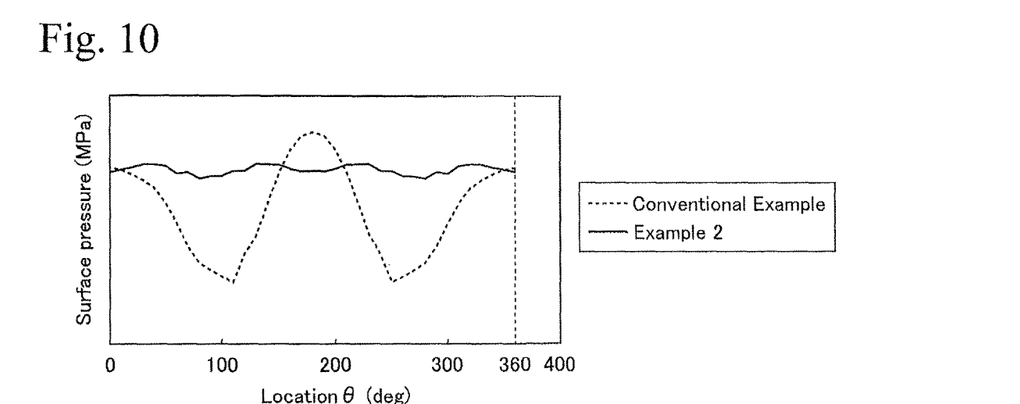
FIG. 10 is a graph showing the surface pressure distribution in the bonding surface (inner circumferential surface) of the hole part of the bush for a stabilizer of the second embodiment according to the present invention (the second aspect of the invention).
Figure 12:
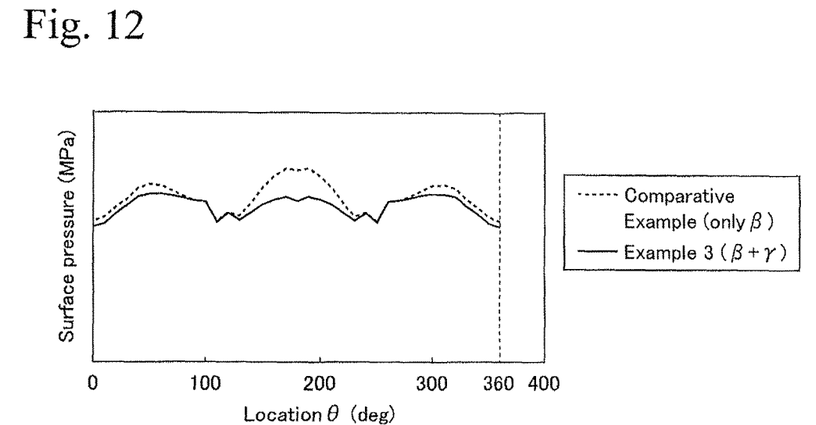
FIG. 12 is a graph showing the surface pressure distribution at the bonding surface (inner circumferential surface) of the hole part of the bush for a stabilizer to which the bonding tool of the third embodiment according to the present invention (the third and fourth aspects of the invention) is attached.

Hereinafter, the first to third embodiments of the invention are explained with reference to the drawings. It should be noted that the bush (bush for a stabilizer) of the first and second embodiments are to be attached to the torsion part 21 of the stabilizer 10 instead of the bushes 30 shown in FIGS. 1 to 3, for example. In the first to third embodiments, the same reference number or symbol is given to a member or a part having the same structure as in FIGS. 1 to 3, and explanation thereof is omitted. The center of FIGS. 5, 6, and 9 is set at a location that is the same as the center O of the bush 30 shown in FIG. 3A for example. The angle θ of FIGS. 7, 10, and 12 is a clockwise angle from the upper end position of the hole part of each embodiment as a standard, and 0° and 360° indicate the uppermost position of the hole part. It should be noted that the surface pressure (surface pressure at each angle position in the bonding surface) and surface pressure difference (surface pressure difference in the bonding surface) in the graphs of FIGS. 7, 8, 10, and 12 are data under conditions in which the bush in which the bar is inserted into the hole part thereof is contained in the bracket or the bonding tool.

(1) First Embodiment

FIGS. 5 and 6 are cross sectional views showing structures of the bush of the first embodiment according to the present invention (the first aspect of the invention). The bush 100 has a similar structure as the bush 30 shown in FIG. 3A, except that the shape of the hole part is different. Practically, the bush 100 is made of an elastic material such as rubber, and in the bush 100, for example, the length A in the horizontal direction, the length (B+α) in the vertical direction, and the shape of the outer circumferential part are similar to those of the bush 30 shown in FIG. 3A.

The hole part 100A of the bush 100 includes the first arc part 101, which is formed at the upside, and the second arc part 102 which is formed at the downside. The first arc part 101 and the second arc part 102 are a circular arc part being circular or approximately circular, or an ellipse arc part being an ellipse or approximately an ellipse. It is desirable that the second arc part 102 be the ellipse arc part, for example. In this case, it is desirable that the shorter axis of the ellipse arc part be located in the horizontal direction.

It should be noted that the shape of the hole part 100A can be a shape in which the first arc part 101 and the second arc part 102 are connected by their common tangent lines. The centers O1 and O2 of the arc parts 101 and 102, respectively, are the centers of circles including the circular arc part in a case in which the arc parts are circular arc parts, and are the centers of ellipses including the ellipse arc part in a case in which the arc parts are ellipse arc parts. The curvature radius r1 of the first arc part 101 is a curvature radius at the uppermost point of the curve of the first arc part 101, and the curvature radius of the second arc part 102 is a curvature radius at the lowermost point of the curve of the second arc part 102.

For example, in the hole part 100A shown in FIG. 5, the first arc part 101 and the second arc part 102 are the circular arc part. In the part between the first arc part 101 and the second arc part 102, these are connected by the common tangent of the first arc part 101 and the second arc part 102, for example. For example, in the hole part 100A shown in FIG. 6, the first arc part 101 and the second arc part 102 are the ellipse arc part. In this case, it is desirable that the hole part 100A form an oval shape.

In the hole part 100A, the center O1 of the first arc part 101 and the center O2 of the second arc part 102 are located at the central line going through the center in a horizontal direction of the bush 100, and these are separated from each other in the vertical direction, for example. The curvature radius r2 of the second arc part 102 is set to be smaller than the curvature radius r1 of the first arc part 101.

A process for bonding of the bar 20 of the stabilizer 10 to the hole part 100A is explained. First, an adhesive is coated on a position of the torsion part 21 of the bar 20 to which the bush 100 is to be bonded, for example. Next, the bar 20 is inserted into the hole part 100A of the bush 100 for example, so that the bush 100 is rendered to be located at the position to be bonded on the torsion part 21.

Subsequently, the bush 100 in which the torsion part 21 is inserted into the hole part 100A thereof, is contained in the U-shaped part 41 of the bracket 40. In this case, the first arc part 101 is located at the opposite side of the opening part side of the U-shaper part 41 (concave part), and the second arc part 102 is located at the opening part side of the U-shaped part 41. Next, the plate (not shown in the figures) is arranged so as to close the opening part of the U-shaped part 41 of the bracket 40, and the plate is fixed to the flange part 42 of the bracket 40. Next, the bush 100, which is contained in the bracket 40, is placed in an adhesive-curing device so as to harden the adhesive. In this way, the torsion part 21 of the bar 20 is bonded on the hole part 100A of the bush 100.

In the first embodiment, in the hole part 100A, the first arc part 101 is formed at the opposite side of the opening part of the U-shaped part 41 of the bracket 40, which is used during bonding, and the second arc part 102 is formed at the opening part side of the U-shaped part 41. In such a hole part 100A, since the second arc part 102, which is set to have small curvature radius r2, is located at a part corresponding to the right and left obliquely lower parts in which surface pressure is smallest in the conventional example shown in FIG. 3A, and the length in the horizontal direction of the hole part 100A at the position is short. According to this structure, surface pressure of a part (the second arc part 102) corresponding to the low surface pressure part of the hole part of the conventional example can be sufficiently increased. In addition, in this case, since the centers O1 and O2 of the first circular arc part 101 and the second circular arc part 102, respectively, are separated from each other and the surface pressure of a part corresponding to the high surface pressure part (surface pressure in the vertical direction) of the hole part of the conventional example shown in FIG. 3A can be appropriately controlled by appropriately setting the gap t between the centers O1 and O2, the surface pressure difference in the bonding surface of the hole part 100A of the bush 100 can be sufficiently small.

Practically, as shown in FIG. 7, in the bush of an example (Example 1) of the first embodiment, the surface pressure difference can be effectively prevented from occurring, unlike in the conventional example in which surface pressure is extremely reduced at the parts of degree θ of about 110° and about 250°.

In this way, in the bonding of the bush 100 to the bar 20 of the stabilizer 10, since the surface pressure in the bonding surface of the hole part 100A of the bush 100 can be made uniform, necessary bonding strength can be obtained. In the first embodiment, compared to the below mentioned second embodiment, cost can be reduced since there is no need to arrange the rigid part 202.

Figure 8:
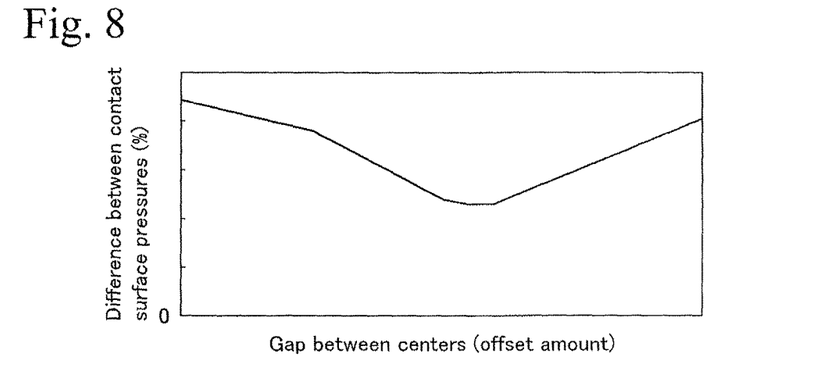
FIG. 8 is a graph showing the relationship of the gap (offset amount) between centers of the first arc part and the second arc part and the surface pressure difference of the bonding surface of the bush for a stabilizer of the first embodiment according to the present invention (the first aspect of the invention).

In particular, since the relationship of the gap t between the centers O1 and O2 and the surface pressure difference at the bonding surface (inner circumferential surface) of the hole part of the bush corresponds to the graph shown in FIG. 8, it is desirable that the gap t be set within a predetermined range in order that the surface pressure difference not be more than a predetermined value. For example, by setting the ratio (t/R) of the gap t between the centers O1 and O2 with respect to the outer diameter R of the bar 20 to 2 to 7%, it is possible for the surface pressure difference in the bonding surface (inner circumferential surface) of the hole part of the bush to be set to be not more than 30%.

(2) Second Embodiment

FIGS. 9A and 9B are cross sectional views showing the structure of the bush of the second embodiment according to the present invention (the second aspect of the invention). The bush 200 includes the elastic part 201 consisting of an elastic material such as a rubber and the rigid part 202 having a higher degree of rigidity than that of the elastic part 201. The rigid part 202 consists of a metallic part, resin part or the like, for example. The hole part 200A of the bush 200 is formed as an ellipse. The longer axis of the ellipse is located in the vertical direction for example, and the shorter axis of the ellipse is located in the horizontal direction, for example. The rigid part 202 is arranged at the lower side of the center O of the hole part 200A.

In the bush 200 of the FIG. 9A for example, the upper surface of the rigid part 202 includes a concave part which is formed in a semicircle in cross section, the elastic part 201 is formed so as to be circular in cross section (for example, a perfect circle in cross section or a perfect circle in cross section), the upper half part of the circular shape forms a part of an outer circumferential part of the bush 200, and the lower half part of the circular shape engages with the concave part of the rigid part 202. For example, in the bush 200 of the FIG. 9B, the rigid part 202 has a shape that is divided in the horizontal direction. In the bush 200, the length A in the horizontal direction, the length in the vertical direction (B+α), and the shape of the outer circumferential part are as the same as those of the bush 30 shown in FIG. 3A.

A process for bonding the bar 20 of the stabilizer 10 to the hole part 200A is performed in a manner similar to that in the bonding process of the first embodiment. In this case, in the containing process of the bush 200 in the U-shaped part 41 of the bracket 40, the rigid part 202 of the bush 200 is arranged at the opening side of the U-shaped part 41, and the longer axis of the ellipse of the hole part 200A is located in a direction parallel to the concave direction (vertical direction) of the U-shaped part 41 of the bracket.

In the second embodiment, since the rigid part 202 is arranged at the part of the opening side of the U-shaped part 41 of the bracket 40 used during bonding, the elastic material of the bush is prevented from flowing to the right and left obliquely lower direction of the hole part, which occurred in the conventional example shown in FIG. 3A. In addition, since the longer axis of the ellipse of the hole part 200A is located in a direction parallel to the concave direction (vertical direction) of the U-shaped part 41, the shorter axis of the ellipse can be located in a direction vertical to the direction (for example, in the horizontal direction in which the excess part for fastening is difficult to arrange), and the length in the horizontal direction of the hole part 200A can be set to be small with respect to the outer diameter R of the bar 20 of the stabilizer 10.

Therefore, by appropriately setting the longer diameter and shorter diameter of the ellipse, the surface pressure of a part corresponding to the low surface pressure part of the hole part of the comparative example can be sufficiently increased, and surface pressure difference in the bonding surface of the hole part 200A of the bush 200 can be set sufficiently small. In practice, as shown in FIG. 10, in the bush of an example (Example 2) of the second embodiment, unlike the bush of the conventional example in which surface pressure is extremely reduced at the parts of degree θ of about 110° and about 250°, the surface pressure difference is not more than 30% (17% in the example of FIG. 10), and thus, the surface pressure difference can be effectively prevented from occurring. In this way, in the bonding of the bush 200 to the bar 20 of the stabilizer 10, since the surface pressure in the bonding surface of the hole part 200A of the bush 200 can be made uniform, necessary bonding strength can be obtained.

In particular, by setting the ratio (D1/R) of the longer diameter D1 of the ellipse of the hole part 200A with respect to the outer diameter R of the bar 20 to 92 to 98%, and by setting the ratio (D2/R) of the shorter diameter D2 of the ellipse of the hole part 200A with respect to the outer diameter R of the bar 20 to 80 to 90%, it is possible for the surface pressure difference at the bonding surface (inner circumferential surface) of the hole part 200A to be set to be not more than 30%.

(3) Third Embodiment

Figure 11:
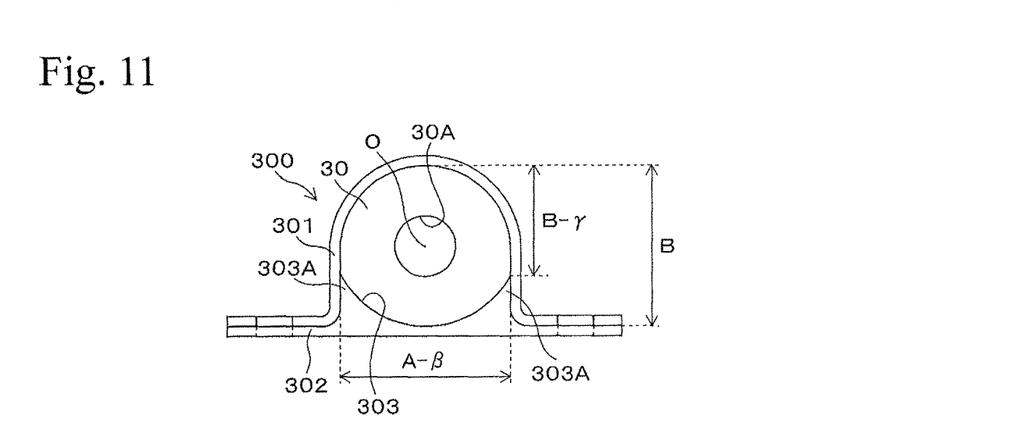
FIG. 11 is a cross sectional view showing the structure of the bonding tool of the third embodiment according to the present invention (the third and fourth aspects of the invention) and showing the bonding tool in a condition in which the bush for a stabilizer is contained.

FIG. 11 shows the structure of the bonding tool of the third embodiment according to the present invention (the third and fourth aspects of the invention), and shows the cross sectional view showing the bonding tool in a condition in which the bush for a stabilizer is contained. The bonding tool 300 includes the bush containing part 301 and the plate part 302. The bush containing part 301 is formed in a shape corresponding to the bracket 40, and has a shape similar to that of the bracket 40 except that the excess part for fastening β is arranged in the horizontal direction (in a direction perpendicular to the concave direction of the concave part of the bush containing part 301).

The bush containing part 301 includes the concave part having a cross section in the shape of the letter U and contains the bush 30 shown in FIG. 3A, for example. The flange parts are formed at both end parts of the concave part of the bush containing part 301 so as to extend toward the outside of the horizontal direction, for example. The plate part 302 includes the pressing part 303 which presses on a bottom part of the bush 30 that is exposed from the opening part of the concave part of the bush containing part 301. At both end parts of the pressing part 303, the convex part 303A, which protrudes upward, is formed. The protruding amount γ of the convex part 303A to the inside of the concave part of the bush containing part 301 can be appropriately set. The shape of the cross section of the upper surface part of such a pressing part 303 is a circular arc shape in which both end parts protrude and the central part is concave.

The bonding process of the bar 20 of the stabilizer 10 to the hole part 30A is performed in a manner similar to that of the bonding process in the first embodiment, but there is a difference in that the bonding tool 300 is used instead of the bracket 40. In the assembling operation of the bush 30 to the bonding tool 300, first, the bush 30, in which the bar 20 of the stabilizer 10 is inserted into the hole part 30A thereof, is contained in the concave part of the bush containing part 301. Next, the opening part of the concave part of the bush containing part 301 in which the bush 30 is contained is closed by the plate part 302. In this case, the bush 30, which is exposed from the opening part of the concave part of the bush containing part 301, is pressed by the pressing part 303 of the plate part 302, so that both end parts of the bottom part of the bush 30 are pressed toward the inside of the concave part of the bush containing part 301 by the convex part 303A of the pressing part 303.

In the bush containing part 301 of the bonding tool 300 of the third embodiment, since the excess part for fastening β is arranged in a direction perpendicular to the concave direction (horizontal direction for example) of the concave part, the outer circumferential side surface part of the bush 30 is pressed toward the central part in the horizontal direction of the bush 30 by the bush containing part 301, and the bonding surface (inner circumferential surface) of the hole part 30A can press the outer circumferential surface of the bar 20 of the stabilizer 10 toward the central part in the horizontal direction. In addition, since the convex part 303A of the pressing part 303 of the plate part 302 protrudes to the inside of the concave part of the bush containing part 301 and presses both end parts of the bottom part of the bush 30 toward the concave direction (upward), the elastic material of the bush can be prevented from flowing to the right and left obliquely lower direction of the hole part as shown in the conventional example in FIG. 3A.

Therefore, by appropriately setting the excess part for fastening β arranged in the horizontal direction of the bush containing part 301 and the protruding amount γ of the convex part 303A of the pressing part 303 to the inside of the concave part of the bush containing part 301, the surface pressure of a part corresponding to high surface pressure part (surface pressure in the vertical direction) of the hole part of the conventional example can be appropriately controlled, and in addition, the surface pressure of a part corresponding to a low surface pressure part of the hole part of the conventional example can be sufficiently increased, and thus, the surface pressure difference in the bonding surface of the hole part 30A of the bush 30 can be set sufficiently small.

Practically, as shown in FIG. 12, in the bush of the example (Example 3) of the third embodiment in which the excess part for fastening β and the protruding amount γ are appropriately set, being different from the bush of the Comparative Example in which only the excess part for fastening β is set, the surface pressure difference can be effectively prevented from occurring, and the surface pressure difference can be set to be not more than 30%, for example.

As is explained, in the bonding of the bar 20 of the stabilizer 10 to the bush 30 by using the bonding tool 300, since the surface pressure can be made uniform in the bonding surface of the hole part 30A of the bush 30, necessary bonding strength can be obtained. In this case, the shape of the bush 30 of the conventional example shown in FIG. 3A can be used as it is.

In particular, by setting the ratio of the excess part for fastening β with respect to the length A in horizontal direction to 0 to 20%, and by controlling inner diameter side, the surface pressure difference in the bonding surface (inner circumferential surface) of the hole part 30A can be set to be not more than 30%.

The invention claimed is:

1. A bush for a stabilizer, comprising:
   a hole part in which a bar of the stabilizer is inserted, and the bush for a stabilizer is contained in a concave part of a bracket and the bar is bonded to the hole part,
   wherein the hole part includes a first arc part and a second arc part,
   the center of the first arc part and the center of the second arc part are separate,
   a curvature radius of the second arc part is set to be smaller than that of the first arc part,
   during bonding of the bar to the hole part, the first arc part is located at the opposite side of the opening part side of the concave part of the bracket, and the second arc part is located at the opening part side of the concave part of the bracket, and
   a ratio of a gap between the centers of the first and the second arc parts with respect to an outer diameter of the bar is set to be 2 to 7%, whereby a surface pressure difference in an inner circumferential surface of the hole part is not more than 30%.

2. The bush for a stabilizer according to claim 1, wherein the first and the second arc parts are ellipse arc parts, and the hole part is oval.

3. A bush for a stabilizer, comprising:
   a hole part in which a bar of the stabilizer is inserted, and the bush for a stabilizer is contained in a concave part of a bracket and the bar is bonded to the hole part, the bush including a rectangular part of which a cross section of an outer circumferential part is linear and a sector part of which a cross section of an outer circumferential part is circular,
   wherein the bush further comprises a rigid part embedded in the bush,
   the rigid part includes a bottom plane part, a side plane part substantially perpendicular to the bottom plane part, and an incline plane part connecting both ends of the bottom plane part and the side plane part, and the rigid part is arranged such that a corner of the bottom plane part and the side plane part faces a corner of the rectangular part,
   the hole part is an ellipse, and
   during bonding of the bar to the hole part, the rigid part is arranged at an opening part side of the concave part, and longer axis of the ellipse is located in a direction parallel to a concave direction of the concave part of the bracket, whereby a surface pressure difference in an inner circumferential surface of the hole part is not more than 30%.

4. The bush for a stabilizer according to claim 3, wherein a ratio of the longer axis of the ellipse of the hole part with respect to an outer diameter of the bar is set to be 92 to 98%, and a ratio of the shorter axis of the ellipse of the hole part with respect to outer diameter of the bar is set to be 80 to 90%.

5. The bush for a stabilizer according to claim 3, wherein the rigid part is arranged only at an opening part side of the concave part of the bracket.

\* \* \* \* \*